United States Patent [19]
Burley

[11] 3,754,534
[45] Aug. 28, 1973

[54] ROTARY COMBUSTION ENGINE IGNITION
[75] Inventor: Harvey A. Burley, Warren, Mich.
[73] Assignee: General Motors Corporation, Detroit, Mich.
[22] Filed: Dec. 23, 1971
[21] Appl. No.: 211,429

[52] U.S. Cl. .............................. 123/8.09, 123/8.45
[51] Int. Cl. ............................................ F02b 53/12
[58] Field of Search .................................. 123/8.09

[56] References Cited
UNITED STATES PATENTS
3,229,674  1/1966  Muller ............................... 123/8.09
3,584,608  6/1971  Shibagaki .......................... 123/8.09
2,027,972  1/1936  Haller ................................ 123/8.09
2,864,346  12/1958 Taylor ............................... 123/8.09

Primary Examiner—Clarence R. Gordon
Attorney—J. L. Carpenter and R. L. Phillips

[57] ABSTRACT

A rotary combustion engine having a spark plug cooperating with a plurality of series arranged electrodes to provide a plurality of sparks in each of a plurality of variable volume working chambers for fuel ignition.

29 Claims, 7 Drawing Figures

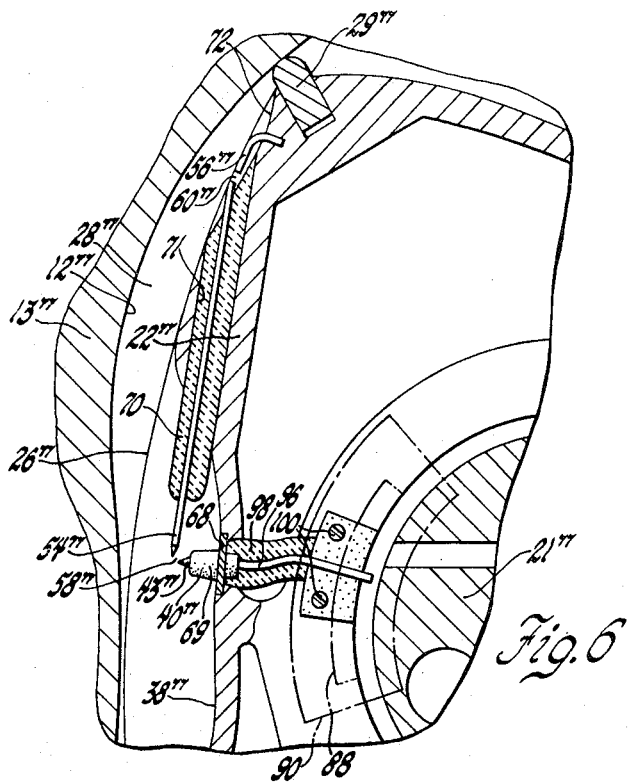
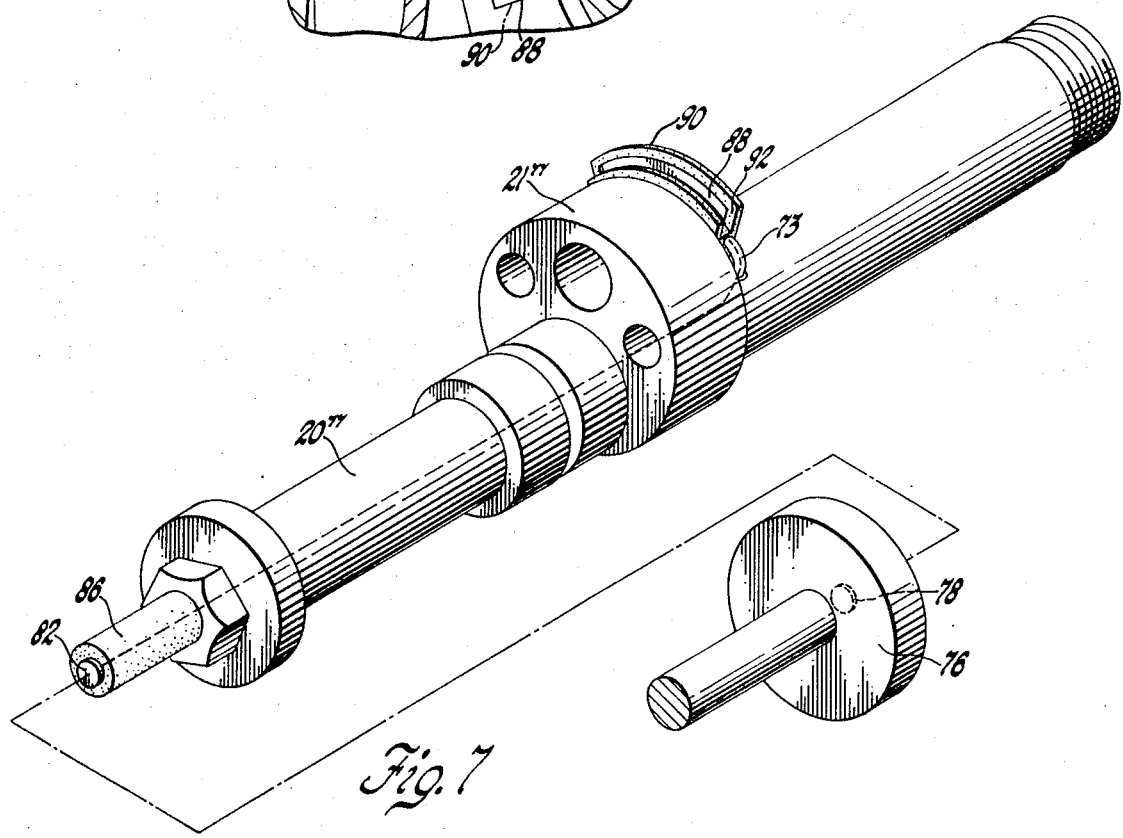

ROTARY COMBUSTION ENGINE IGNITION

This invention relates to rotary combustion engines and more particularly to multispark ignition systems for rotary combustion engines.

In rotary combustion engines of the Wankel type, it is present commercial practice to employ two spark plugs to obtain maximum power. The use of two spark plugs results from the recognition that the turbulence in this type of rotary combustion engine differs from that in a reciprocating piston engine in that when the rotor in such a rotary combustion engine is in the vicinity of top dead center, a substantial pressure gradient exists between the leading and trailing portions of the contracted working chamber across the engine's minor axis. The resulting gas velocities which are in the direction of rotor rotation have been found to be so high that flame travel upstream or in the opposite direction of rotation is very slow. This results in a longer duration and thus a less efficient charge burn time and lower than desired peak pressures which all adds up to low power. This problem has been mitigated to a certain extent by the use of two spark plugs which are arranged so that one is located upstream of the other with this upstream plug being called the trailing plug. In normal practice the trailing plug is used to initiate fuel combustion at about the same time as the leading plug and the higher peak pressures when both plugs are used has been found to result in a substantial power gain. However, the commercial dual spark plug arrangement has certain disadvantages in that there is the cost of both the additional spark plug and the required second ignition system. Furthermore, when the two spark plugs are located in the rotor housing there is a loss of cooling channels in this area due to the additional spark plug boss. Because of loss of cooling from the use of two plugs, it has been commercial practice to use a material such as aluminum for the rotor housing because of its high heat transfer coefficient as compared with other less costly material such as cast iron which has a lower heat transfer coefficient but better wear properties.

The ignition system according to the present invention provides two or more sparks for fuel ignition in each of the combustion chambers with one spark plug. In one embodiment of the invention, a single spark electrode provided by a spark plug with a center electrode but without a ground electrode is located in the rotor housing in a position to be exposed to each combustion chamber of the engine when in the vicinity of top dead center. On each chamber face of the rotor, there is mounted a plurality of electrodes arranged to be in series with the spark plug electrode with the rotor mounted electrodes starting at one end adjacent the spark plug electrode being insulated from the rotor and the last electrode at the other end being grounded through the rotor. With this arrangement, when a voltage is applied between the spark plug electrode and the ground electrode, sparks are caused to occur at the gaps between the several adjacent electrodes at points spaced along the length of the combustion chamber. In another embodiment, a spark plug is located in each face of the rotor together with the series arranged electrodes.

An object of the present invention is to provide a new and improved rotary combustion engine ignition system.

Another object is to provide a new and improved multi-spark arrangement in a rotary combustion engine ignition system.

Another object is to provide in a rotary combustion engine ignition system series arranged electrodes which cooperate to provide a plurality of sparks at points spaced along the combustion chamber length for fuel ignition in each combustion chamber of the engine.

Another object is to provide in an internal combustion rotary engine a spark electrode cooperating with a plurality of series arranged electrodes on the rotor to provide a plurality of sparks including a leading spark and trailing spark for igniting fuel in each combustion chamber of the engine.

Another object is to provide in an internal combustion rotary engine a spark electrode cooperating with a plurality of series arranged electrodes on the rotor to provide a plurality of sparks including a spark in the trailing portion of each combustion chamber where the fuel mixture is relatively rich for igniting fuel in each combustion chamber of the engine.

Another object is to provide in an internal combustion rotary engine a single spark electrode located on the engine housing cooperating with a plurality of series arranged electrodes on each chamber face of the engine's rotor to provide a plurality of sparks for igniting fuel in each combustion chamber of the engine.

Another object is to provide in an internal combustion rotary engine series arranged electrodes all located on each of the rotor's chamber faces operating to provide a plurality of sparks for igniting fuel in each combustion chamber of the engine.

These and other objects of the present invention will become more apparent from the following description and accompanying drawing in which:

FIG. 6 is a partial transverse sectional view of an internal combustion rotary engine like that in FIG. 1 incorporating another embodiment of the ignition system according to the present invention.

FIG. 7 is a perspective view of the crankshaft in FIG. 6 with portions of the ignition system.

Figure 1:
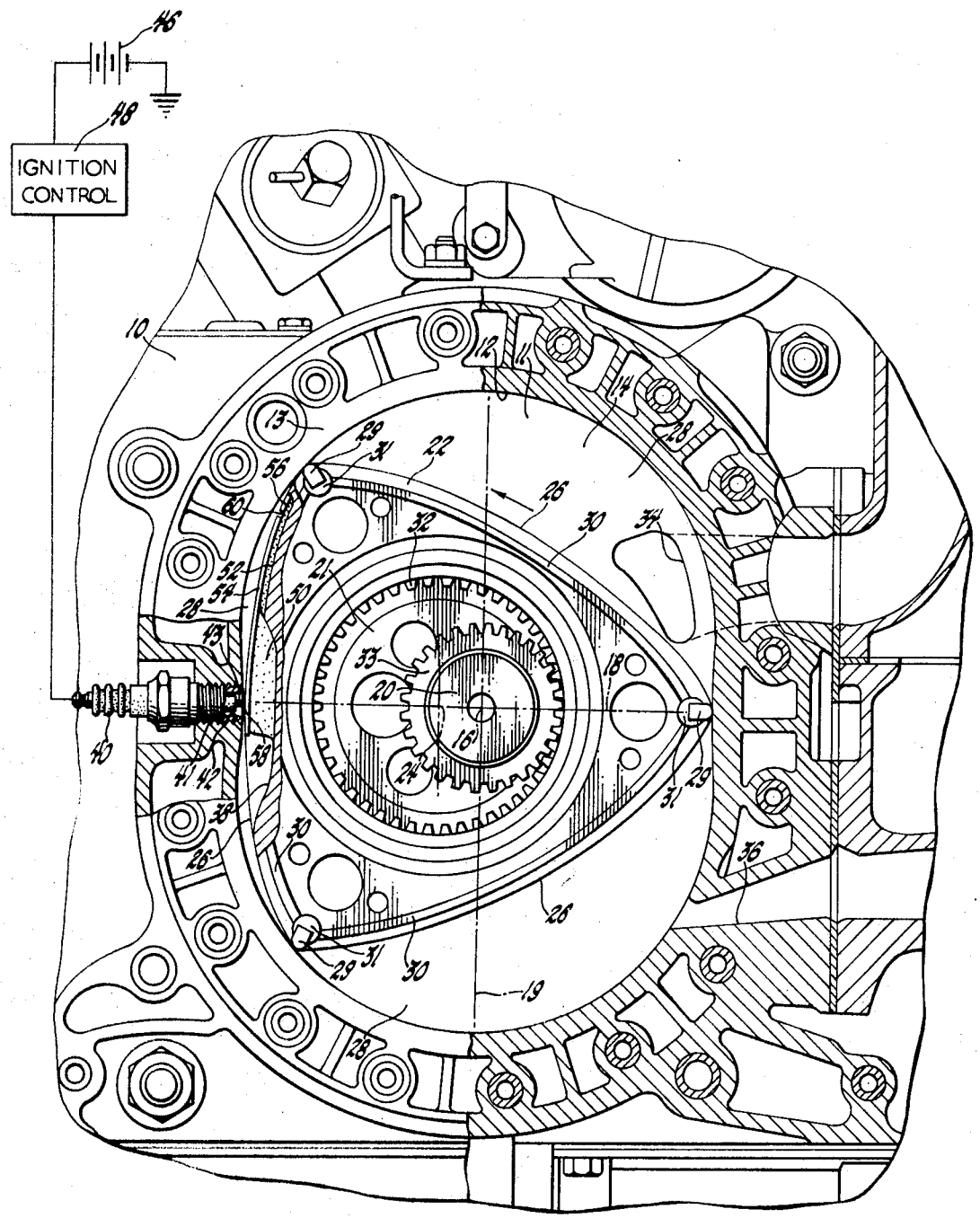
FIG. 1 is a transverse sectional view of an internal combustion rotary engine incorporating one embodiment of the ignition system according to the present invention.

Referring to FIG. 1, one embodiment of an ignition system according to the present invention is illustrated for use in an internal combustion rotary engine of the Wankel type comprising a stationary outer body 10. The outer body 10 has a cavity 11 that is defined by an inwardly facing peripheral wall 12 of a rotor housing 13 and a pair of axially spaced side walls 14 of end housings of which only one is shown. The peripheral wall 12 is in the shape of a two-lobed epitrochoid or a curve parallel thereto whose center is indicated at 16 where the curve's minor axis 18 and major axis 19 intersect. A power output shaft 20 which may also be called a crankshaft extends through the cavity 11 and is rotatably supported by the housing 10 in the end walls 14 so that the shaft's axis is coincident with the center 16 and parallel to the peripheral wall 12.

The power output shaft 20 is provided in the cavity 11 with an eccentric 21 on which a rotor 22 is mounted for rotation about the eccentric's axis 24, this axis being spaced from and parallel to the output shaft's axis 16. Rotor 22 has the general shape of a triangle with faces 26 which are convex and face the peripheral wall 12 and cooperate therewith and with the end walls 14 to define three variable volume combustion or working chambers 28. An apex seal 29 is mounted at each apex or corner of the rotor 22 and a side seal 30 is arranged to extend between each set of adjacent apex seals 29 with an intermediate button seal 31 providing a sealing link between adjacent side and apex seals. The apex seals 29 continuously engage the peripheral wall 12 and both the side seals 30 and button seals 31 engage the side walls 14 with the complete seal arrangement acting to seal the chambers 28. With the two-lobed peripheral wall 12 and the three-lobed rotor 22 there are provided the four phases of intake, compression, expansion and exhaust in each chamber in fixed relation to the housing by forcing the rotor to rotate at one-third the speed of the output shaft. This is accomplished by a gear train comprising an internally toothed ring gear 32 that is fixed to the rotor 22 concentric with the rotor axis 24. Ring gear 32 meshes with an externally toothed gear 33 which is concentric with the power output shaft axis 16 and is made stationary by being fixed to the engine housing 10. The ring gear 32 has one and one-half times the number of teeth as the gear 33 to provide the required ratio of 3:1 between the power output shaft 20 and rotor 22. An air-fuel mixture is made available to each chamber 28 by an intake passage 34 that extends through the housing 10 and has one or more openings to the cavity 11 through the end wall 14, this porting to the cavity being located to one side of and near the minor axis 18 and to one side of the major axis 19. The exhaust products of combustion are exhausted from each chamber 28 by an exhaust passage 36 which extends through the housing 10 to the cavity 11 on the same side of the major axis 19 as intake passage 34 but on the opposite side of and near the minor axis 18 as shown in FIG. 1. A single channel or depression 38 is normally provided in the center of each chamber face 26 of the rotor to provide for the transfer of working gases across the narrow central portion of the peripheral wall 12 at the minor axis 18 when each of the rotor faces is at or near top dead center so that a chamber is not separated or divided at the time when combustion is occurring therein.

The engine construction thus far described is conventional. Typically, such engines have each of the three working chambers undergoing intake, compression, expansion and exhaust with a single rotor arrangement as shown in FIG. 1 providing a power phase for each revolution of the engine output shaft. As the rotor rotates in the direction of the arrow in FIG. 1, the fuel-air mixture is drawn behind the leading apex seal through the intake passage 34 into each working chamber 28 after which the inlet passage is closed to this chamber by the trailing apex seal. The mixture in this chamber is then compressed and when the rotor is near or at top dead center as shown in FIG. 1, this mixture is ignited. It is conventional practice to have a single spark plug located in the rotor housing 13 at or near the minor axis 18 on the side opposite the intake and exhaust porting to provide a spark near or at top dead center for igniting the mixture. It is also conventional practice to have two spark plugs with these plugs located on opposite sides of the minor axis 18 so that one plug is said to be upstream of the other plug and is referred to as the trailing plug. With ignition of the mixture in a chamber, the peripheral wall takes the reaction forcing the rotor to continue rotation while the gas is expanding. Eventually the leading apex seal passes the exhaust passage so that the burned gas mixture in this chamber is expelled to the atmosphere to complete the cycle. In the case of two spark plugs, the ignition control therefor operates these plugs so that the trailing plug initiates fuel combustion at about the same time as the leading plug which has the effect of producing higher peak pressures to effect a power gain over the single plug arrangement. However, the dual spark plug arrangement has inherent disadvantages in that there is the cost of the additional spark plug and the required second ignition circuit therefor. In addition there is a loss of cooling channels in the rotor housing due to the additional spark plug boss which in turn has been found to necessitate the use of a rotor housing material such as aluminum to provide the heat transfer capability required but which on the other hand does not have as good wear qualities as other less costly materials with lower heat transfer ability such as cast iron.

Figure 2:
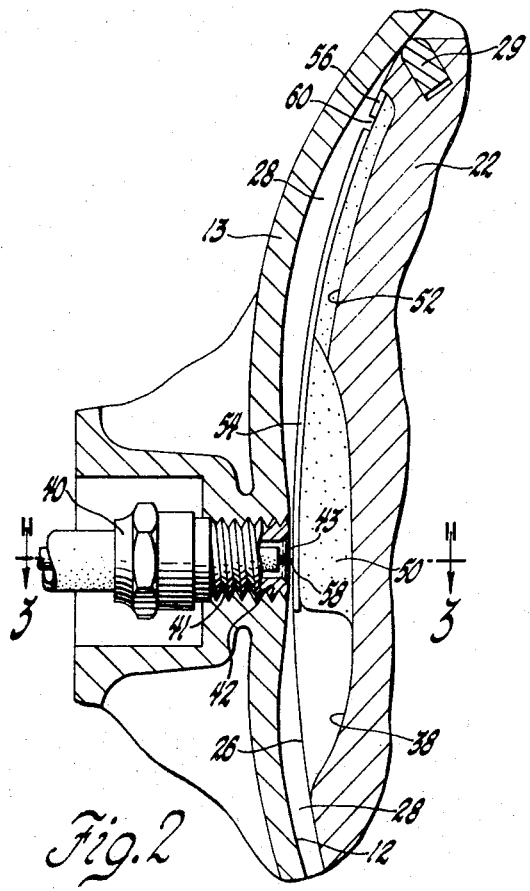
FIG. 2 is an enlarged partial view of the rotor and rotor housing including the spark ignition arrangement of FIG. 1.
Figure 3:
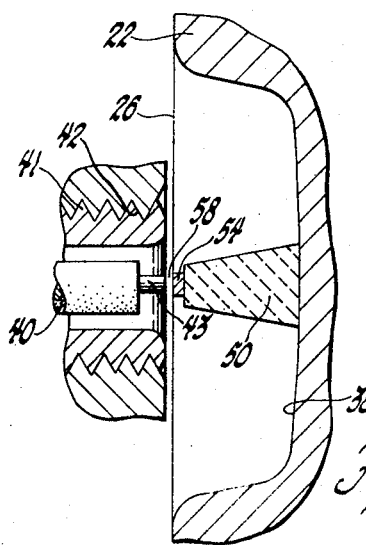
FIG. 3 is a view of the rotor and one of the rotor electrodes taken along the line 3—3 in FIG. 2.

According to the present invention, multispark operation is provided by a spark plug cooperating with a plurality of series arranged electrodes to effect ignition in each chamber. One embodiment of the invention is shown in FIGS. 1 – 3 and comprises a single spark plug 40 having a threaded body 41 which is secured in a threaded opening 42 in the rotor housing. Opening 42 is preferably located to connect with cavity 11 at a point on the peripheral wall 12 midway between the end walls 14 and at the narrow waist portion of the epitrochoidal cavity on the minor axis 18 generally opposite the side on which the intake and exhaust ports are located. The spark plug 40 has a single center electrode 43 which is insulated from the spark plug's threaded body 41 but has no grounded electrode. The single central electrode 43 which may also be called a spark electrode extends radially inward to a point substantially flush with the peripheral wall 12. Voltage is applied to the spark electrode 43 from the vehicle's storage battery 46 by an ignition control 48 which may be of any other suitable conventional type capable of applying proper voltage at the appropriate time.

Further describing the electrode arrangement, a bridge 50 of electrical insulating material such as ceramic is secured to each rotor chamber face 26 in the transfer channel 38. Each of the bridges 50 at its leading end extends radially upwardly from the bottom of the rotor channel 38 starting at a point about midway along the channel length and extends to the trailing end of the channel where it then continues in an added channel 52 in the rotor face of relatively constant depth to a point close to the trailing apex seal. A pair of end-to-end arranged electrodes 54 and 56 which may be rectangular in cross-section as shown are secured by any suitable cement to the top of each insulating bridge 50 in an axial location opposite the spark plug electrode 43 with the leading electrode 54 extending from a point midway the length of channel 38 to a point near the trailing apex seal and being of long length as compared to the other electrode 56. The trailing electrode 56 is spaced at its leading end from the trailing end of the leading electrode 54 and at the other end is grounded by being secured to the rotor 22, the electrical path to complete the circuit from the rotor to ground and thence back to the voltage source being provided by the bearings supporting the rotor and its shaft as well as by the timing gear teeth.

As shown in FIGS. 1 and 2, there is an air gap 58 between the spark plug electrode 43 and the rotor electrode 54 and an air gap 60 between the rotor electrodes 54 and 56. According to the present invention, the capacitance across the leading gap 58 is made considerably less than that across the trailing gap 60 to ground by making the length of electrode 54 large in respect to the width of spark electrode 43 and since the voltage division is inversely proportional to the capacitance, a greater percentage of the applied voltage appears across the leading gap 58 to effect electrical breakdown of this gap. When leading gap 58 has been bridged, all of the applied voltage except for the small amount in the plasma at leading gap 58 appears across trailing gap 60 and this gap also is quickly bridged. The capacitances of gaps 58 and 60 are made very low and because of their values, the double gap breakdown takes place almost instantaneously with the leading spark at gap 58 occurring near top dead center at a mid point in the chamber and the trailing spark at gap 60 occurring near the trailing end of the chamber a very short time later.

In operation with the ignition system disclosed, as each rotor face 26 passes through its top dead center smallest chamber volume position opposite the spark plug 40, the rotor carried leading electrode 54 on that rotor face passes adjacent the spark electrode 43 at a predetermined time in the cycle, the ignition control 48 operates to impress voltage across the opposed electrodes 43 and 54 causing a spark to jump the gap 58 between them. With this gap 58 bridged, all of the applied voltage except for a small amount in the plasma in gap 58 appears across gap 60 near the trailing end of this chamber and this gap is also quickly bridged. Since the capacitance of these gaps is very low, the double gap breakdown takes place almost instantaneously with the result that fuel ignition at these leading and trailing places occurs almost instantaneously. To illustrate the relative values, in one installation the capacitance across the leading gap 58 was made to be about 0.5 pF and that across the other gap 60 was made to be about 5.0 pF while the gap sizes were substantially equal and equivalent to those found in conventional spark plugs with grounded electrodes. This resulted in about 90 percent of the applied voltage appearing across leading gap 58 to facilitate its electrical breakdown and upon bridging of this gap, almost all of the voltage then appeared across the trailing gap 60 except for a few percent in the plasma at gap 58. As compared with a conventional dual spark plug ignition system, the dual spark provided in this example was obtained with only about a 10 percent increase in the ignition voltage requirement. It will also be appreciated that the size of the leading gap 58 may remain constant as it moves relative to the spark plug electrode 43 or the rotor mounted electrode 54 may be profiled in the radial direction to vary the gap size in accordance with a certain spark requirement to meet various engine operating conditions. This control of the gap size for improved operation is fully disclosed in my copending application Ser. No. 134,303 filed Apr. 15, 1971 and assigned to the assignee of this invention.

Figure 4:
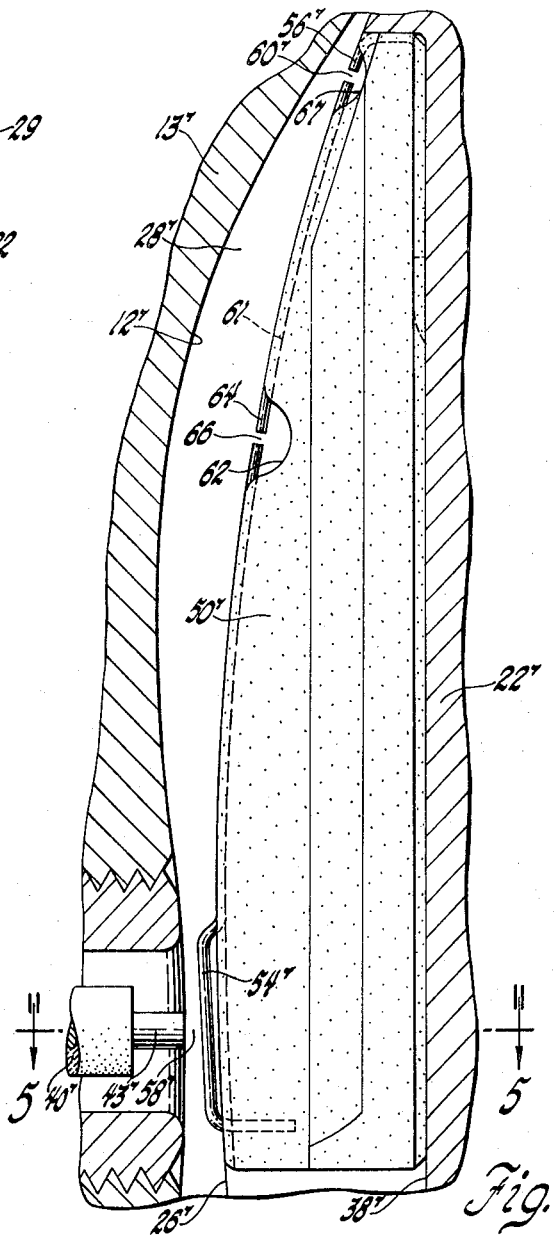
FIG. 4 is a view similar to FIG. 2 but further enlarged of a three electrode arrangement on the rotor in place of the two electrode arrangement of FIGS. 1 and 2.
Figure 5:
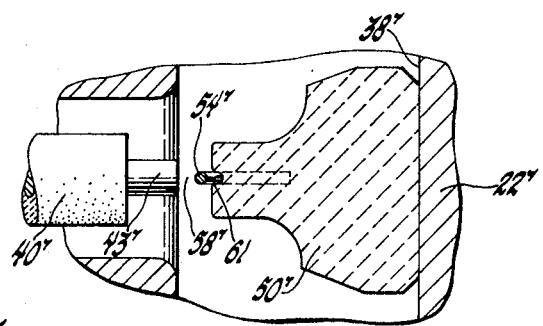
FIG. 5 is a view of the rotor and one of the rotor electrodes taken along the line 5—5 in FIG. 4.

My invention also contemplates the provision of more than two sparks as is illustrated in FIGS. 4 and 5. In the FIG. 4 and 5 embodiments, parts corresponding to those in FIGS. 1 – 3 are identified by corresponding numerals only primed and added parts are designated by new numerals. In the FIG. 4 embodiment, there is provided three sparks for fuel ignition by in effect adding a third series arranged spark gap at a point intermediate the leading and trailing spark gaps in the FIG. 1 embodiment. In the FIG. 4 embodiment, the rotor electrodes on each rotor face are in the form of round wire and are fitted in a groove 61 in electrical insulator element 50' which is secured in an accommodating slot in each rotor face. The leading wire electrode 54' has a right angle bend press fitted in a radial hole in the ceramic element 50' and follows an arcuate path from one side of the housing mounted spark plug electrode 43' to the other side with the rotor face at top dead center position whereafter the wire electrode then bends radially inward to fit in groove 61. Electrode 54' continues toward the trailing apex end terminating at a recess 62 in the radially outer surface of ceramic element 50'. The trailing end of the leading electrode 54' is located opposite the leading end of an intermediate electrode 64 leaving a spark gap 66 therebetween. The intermediate wire electrode 64 is also fitted within the groove 61 and extends toward the trailing end until it reaches another recess 67 formed in the radially outer surface of ceramic element 50'. The trailing end of the intermediate electrode 64 is located opposite the leading end of the trailing wire electrode 56' which is mounted in groove 61 and is grounded to the rotor 22 by being received in an extension of groove 61 about the trailing end of the ceramic element and being clamped against the rotor by this element. In this arrangement and on application of voltage to the spark plug electrode 43', the applied voltage bridges the gaps 58', 66 and 60' in that sequence with such triple gap breakdown taking place almost instantaneously resulting in three sparks to increase the speed of combustion.

In the previously described arrangements according to the present invention, multiple spark is provided without the use of an additional spark plug in the housing and thus there is no added cooling loss as compared with a dual spark plug arrangement. Referring to FIGS. 6 and 7, there is illustrated another embodiment of the present invention wherein multiple sparks are provided for fuel ignition without any spark plug located in the rotor housing. This enables additional housing cooling and also eliminates the gas leak path resulting from a spark plug hole in the peripheral wall of the rotor housing. In the FIG. 6 and 7 embodiments, parts corresponding to those shown in FIGS. 1 and 4 are identified by the same numerals only double primed and new parts are designated by new numbers. Referring to FIG. 6, spark plug 40'' without a ground electrode is located and secured by a metal flange 68 in each rotor face 26' in the transfer channel 38'' at a point intermediate the channel length instead of being located in the rotor housing. The center electrode 43'' of spark plug 40'' is insulated from the rotor by a ceramic body 69 securing the plug to the rotor and projects radially outward into channel 38'' and is spaced by gap 58'' from intermediate wire electrode 54''. The intermediate wire electrode 54'' is mounted in a cylindrical ceramic insulator 70 which fits in a bore 71 that extends through the rotor from the transfer passage 38'' to a channel 72 in the rotor face near the trailing rotor apex. The trailing end of the intermediate electrode 54'' is located in channel 72 and is spaced by gap 60'' from the trailing wire electrode 56'' which has a bent end press fitted in a hole in the rotor near the trailing apex. Thus, in the FIG. 6 embodiment there is provision for two sparks as in the FIG. 1 embodiment on the application of voltage to the spark plug 40''.

As shown in FIG. 7, voltage is provided to spark electrode 43'' by a high voltage insulated wire 73 which extends through a passage in crankshaft 20'' from one crankshaft end to a radial opening adjacent eccentric 21''. A rotary disc 76 suitably connected to receive voltage from the ignition control has a contact 78 from which pulses from the ignition control destined for the spark electrode 43'' jump to a terminal 82 that is connected to wire 73, the terminal 82 being mounted on the end of the crankshaft by a mount 86 of nonconductive material. The voltage is conducted along the wire 73 to an arcuate shaped metal conductor 88 which is mounted on an arcuate channel member 90 of nonconductive material that is secured to the crankshaft 20'' so as to be centered with the top dead center position of the eccentric 21''. The metal strip 88 lies in channel 92 of channel member 90 so as to be insulated from the crankshaft.

Referring to FIG. 6, the spark plug electrode 43'' is connected to a lead 96 which is encased in an insulating body 98 where it passes through the rotor, the insulator body 98 having a base portion which is secured to the rotor by screws 100. The lead 96 extends radially inward past the rotor body into the channel 92 with its radially inner end terminating adjacent the bottom of this channel so that as the crankshaft rotates and when each rotor face is in the vicinity of top dead center, the voltage from conducting strip 88 jumps to the appropriate lead 96 and continues therethrough to the spark plug electrode 43'' in the combustion chamber having mixture to be ignited. The voltage jumps gap 58'' and then follows electrode 54'' and jumps across the other gap 60'' to the electrode 56'' which is at ground potential. The length of the contact strip 88 is such that voltage can be applied for sparking over a relatively large angle to provide for ignition timing changes.

As a further modification to provide a more direct route to ground in the FIG. 1, 4 and 6 embodiments, the trailing spark is made to jump to the peripheral wall 12, 12', or 12'' instead of to the grounded rotor electrode 56, 56', or 56'' by controlling gap size.

In all of the embodiments there is provided greater flexibility in locating the trailing spark as compared with dual spark plug arrangements. In the two plug system, power is lost when the trailing plug is located near the trailing seal because of the high pressure differentials across this seal. As a result, it has been the practice to locate the trailing plug close to top dead center. In my multiple spark arrangements, the trailing gap can be placed at any desired location between the minor axis and the trailing apex seal to facilitate rapid combustion of gases in this area.

I have also found that in my multispark ignition system arrangements the gap sizes can be selected so that there is in effect only a single spark under certain conditions for sustaining fuel combustion for the purpose of minimizing exhaust emissions. The basic purpose of the multispark gap system is to increase maximum available power, however it has been found that at medium and light loads with slow burning such as provided with one spark, there results lower emissions. For this purpose it is present commercial practice in those systems having dual spark plugs to employ a switching system to cut out electrical power to the trailing plug at low engine load to achieve low emissions. In such systems both plugs fire under heavy loads but only the leading plug fires during medium and light loads. In the present multispark arrangement, the feature of one spark at light and medium loads to benefit emissions and multiple sparks at heavy loads to increase power can be readily achieved without additional control circuitry. This is accomplished by making the size of the trailing gap 60, 60', and 60'' in the FIG. 1, 4 and 6 embodiments so small that a spark in a gap of this small size will only ignite mixtures under heavy engine loads and relatively rich fuel mixtures while the leading spark or sparks continue to ignite the mixtures under all engine loads. Thus under lighter loads and leaner fuel mixtures there will not be proper ignition by the trailing spark because the electrodes will quench the flame kernel at this spark before it achieves that critical size above which self-sustained combustion is assured. For example, providing the trailing gap with a size of about 0.010 inches while the leading gap remains at a normal size of about 0.030 inches has been found to exhibit such characteristics. Thus, by mere selection of the size and configuration of the trailing gap, its part in fuel ignition is controlled to achieve what was before accomplished by ignition switching operation dependent on engine load signals. It will also be appreciated that the quench can be reversed whereby the small gap with spark for ignition only at low engine load is the leading gap and the larger gap having a spark that ignites at all times would trail.

The above described embodiments are illustrative of the invention which may be modified within the scope of the appended claims.

I claim:

1. A rotary combustion engine comprising a housing having a cavity, a rotor disposed in said cavity, an output shaft rotatably supported by said housing and having an eccentric rotatably supporting said rotor, said rotor and said housing cooperatively providing a plurality of variable volume working chambers spaced around said rotor that move with said rotor within said housing, intake passage means periodically connected to each of said working chambers as said rotor moves, exhaust passage means periodically connected to each of said working chambers as said rotor moves, and multispark ignition means for periodically providing a plurality of series arranged electrode spark gaps in a single circuit to effect a plurality of sparks in each of said working chambers after connection to said intake passage means and before connection to said exhaust passage means.

2. A rotary combustion engine comprising a housing having a cavity, a rotor disposed in said cavity, an output shaft rotatably supported by said housing and having an eccentric rotatably supporting said rotor, said rotor and said housing cooperatively providing a plurality of variable volume working chambers spaced around said rotor that move with said rotor within said housing, intake passage means periodically connected to each of said working chambers as said rotor moves, exhaust passage means periodically connected to each of said working chambers as said rotor moves, and multispark ignition means comprising a plurality of electrodes that are periodically arranged in series in a single circuit with intermediate spark gaps in each of said working chambers as said rotor moves for providing a plurality of sparks in each of said working chambers after connection to said intake passage means and before connection to said exhaust passage means.

3. A rotary combustion engine comprising a housing having a cavity, a rotor disposed in said cavity, an output shaft rotatably supported by said housing and having an eccentric rotatably supporting said rotor, said rotor and said housing cooperatively providing a plurality of variable volume working chambers spaced around said rotor that move with said rotor within said housing, intake passage means periodically connected to each of said working chambers as said rotor moves, exhaust passage means periodically connected to each of said working chambers as said rotor moves, and multispark ignition means comprising a plurality of electrodes that are periodically arranged with at least three in series in a single circuit with intermediate spark gaps in each said working chamber as said rotor moves with each series of electrodes including an intermediate electrode insulatedly mounted on said rotor in each of said working chambers for providing a plurality of sparks in each of said working chambers after connection to said intake passage means and before connection to said exhaust passage means.

4. A rotary combustion engine comprising a housing having a cavity, a rotor disposed in said cavity, an output shaft rotatably supported by said housing and having an eccentric rotatably supporting said rotor, said rotor and said housing cooperatively providing a plurality of variable volume working chambers spaced around said rotor that move with said rotor within said housing and wherein each of said working chambers has a leading end and a trailing end, intake passage means for periodically supplying a combustible mixture to each of said working chambers as said rotor moves, exhaust passage means for periodically exhausting each of said working chambers as said rotor moves, and multispark ignition means for periodically providing in each of said working chambers a plurality of series arranged electrode spark gaps in a single circuit spaced along the length of each said working chamber between said leading and trailing ends including a leading spark gap and a trailing spark gap to effect a spark at the leading spark gap and also at the trailing spark gap to ignite the combustible mixture in each said working chamber.

5. The rotary combustion engine set forth in claim 4 and said leading spark gap having a capacitance thereacross substantially smaller than that of any other spark gap.

6. The rotary combustion engine set forth in claim 4 and one of said gaps in each said working chamber having a sufficient size so that a spark thereacross at engine loads below a predetermined load and above a predetermined air-fuel ratio is insufficient to ignite the combustible mixture.

7. A rotary combustion engine comprising a housing having a cavity, a rotor disposed in said cavity having a plurality of faces, an output shaft rotatably supported by said housing and having an eccentric rotatably supporting said rotor, said rotor faces and said housing cooperatively providing a plurality of variable volume working chambers spaced around said rotor and moving therewith within said housing and wherein each said rotor face has a leading end and a trailing end, intake passage means periodically connected to each of said working chambers as said rotor moves, exhaust passage means periodically connected to each of said working chambers as said rotor moves, and multispark ignition means comprising at least one electrode insulatedly mounted on each of said rotor faces, spark electrode means spaced at least periodically a spark gap from said one electrode on each said rotor face at a place intermediate said rotor face leading and trailing ends, grounded electrode means spaced at least periodically a spark gap from said one electrode on each said rotor face at a place intermediate the first-stated spark gap and said rotor face trailing end at the same time as the first-stated spark gap.

8. The rotary combustion engine set forth in claim 7 and said spark electrode means comprising a single spark electrode mounted on said housing.

9. The rotary combustion engine set forth in claim 7 and said spark electrode means comprising a spark electrode mounted on each said rotor face.

10. The rotary combustion engine set forth in claim 7 and said grounded electrode means comprising an electrode on each said rotor face.

11. The rotary combustion engine set forth in claim 7 and said grounded electrode means comprising single electrode means on said housing.

12. The rotary combustion engine set forth in claim 8 and said grounded electrode means comprising an electrode on each said rotor face.

13. The rotary combustion engine set forth in claim 8 and said grounded electrode means comprising single electrode means on said housing.

14. The rotary combustion engine set forth in claim 9 and said grounded electrode means comprising an electrode on each said rotor face.

15. The rotary combustion engine set forth in claim 9 and said grounded electrode means comprising single electrode means on said housing.

16. The rotary combustion engine set forth in claim 7 and the leading spark gap having a capacitance thereacross substantially smaller than that of any other spark gap.

17. The rotary combustion engine set forth in claim 7 and one of said spark gaps in each said working chamber having a sufficient size so that a spark thereacross at engine loads below a predetermined load and above a predetermined air-fuel ratio is insufficient for fuel ignition.

18. A rotary combustion engine comprising a housing having a cavity, said cavity having a peripheral wall having basically the profile of a two-lobed epitrochoid, a rotor disposed in said cavity having basically the profile of a triangle with three faces facing said peripheral wall, an output shaft rotatably supported by said housing and having an eccentric rotatably supporting said rotor, said rotor faces and said housing cooperatively providing three variable volume working chambers spaced around said rotor and moving with said rotor and varying between a minimum volume and a maximum volume as said rotor and said output shaft turn and wherein each said rotor face has a leading end and a trailing end, intake passage means connected to each said working chamber prior to contraction as said rotor planetates, exhaust passage means connected to each said working chamber after contraction as said rotor planetates, and multispark ignition means comprising a spark plug mounted on said housing having a non-grounded first electrode arranged to be exposed to each working chamber in a contracted condition occurring after connection to said intake passage means and before connection to said exhaust passage means, a non-grounded second electrode insulatedly mounted on each said rotor face intermediate said leading and trailing ends and arranged to pass opposite said spark plug electrode with a spark gap therebetween at a leading place at least proximately midway between said rotor face leading and trailing ends as said rotor planetates, a grounded third electrode mounted on each said rotor face and spaced a spark gap from said non-grounded second electrode at a trailing place intermediate the first-stated spark gap and said rotor face trailing end whereby on application of voltage across said spark plug electrode and said grounded electrode there is effected a spark across each of said spark gaps in each of said working chambers while in a contracted condition.

19. The rotary combustion engine set forth in claim 18 and the leading spark gap having a capacitance thereacross substantially smaller than that of any other spark gap.

20. The rotary combustion engine set forth in claim 18 and one of said spark gaps in each said working chamber having a sufficient size so that a spark thereacross at engine loads below a predetermined load and above a predetermined air-fuel ratio is insufficient for fuel ignition.

21. A rotary combustion engine comprising a housing having a cavity, said cavity having a peripheral wall having basically the profile of a two-lobed epitrochoid, a rotor disposed in said cavity having basically the profile of a triangle with three faces facing said peripheral wall, an output shaft rotatably supported by said housing and having an eccentric rotatably supporting said rotor, said rotor faces and said housing cooperatively providing three variable volume working chambers spaced around said rotor and moving with said rotor and varying between a minimum volume and a maximum volume as said rotor and said output shaft turn and wherein each said rotor face has a leading end and a trailing end, intake passage means connected to each said working chamber prior to contraction as said rotor planetates, exhaust passage means connected to each said working chamber after contraction as said rotor planetates, and multispark ignition means comprising a spark plug mounted on each of said rotor faces having a non-grounded first electrode exposed to each working chamber, a non-grounded second electrode insulatedly mounted on each said rotor face and spaced a spark gap from said spark plug electrode at a leading place at least proximately midway between said rotor face leading and trailing ends, a grounded third electrode mounted on each said rotor face and spaced a spark gap from said non-grounded second electrode at a trailing place intermediate the first-stated spark gap and said rotor face trailing end whereby on application of voltage across said spark plug electrode and said grounded electrode there is effected a spark across each of said spark gaps in each of said working chambers while in a contracted condition.

22. The rotary combustion engine set forth in claim 21 and the leading spark gap having a capacitance thereacross substantially smaller than that of any other spark gap.

23. The rotary combustion engine set forth in claim 21 and one of said spark gaps in each said working chamber having a sufficient size so that a spark thereacross at engine loads below a predetermined load and above a predetermined air-fuel ratio is insufficient for fuel ignition.

24. A rotary combustion engine comprising a housing having a cavity, said cavity having a peripheral wall having basically the profile of a two-lobed epitrochoid, a rotor disposed in said cavity having basically the profile of a triangle with three faces facing said peripheral wall, an output shaft rotatably supported by said housing and having an eccentric rotatably supporting said rotor, said rotor faces and said housing cooperatively providing three variable volume working chambers spaced around said rotor and moving with said rotor and varying between a minimum volume and a maximum volume as said rotor and said output shaft turn and wherein each said rotor face has a leading end and a trailing end, intake passage means connected to each said working chamber prior to contraction as said rotor planetates, exhaust passage means connected to each said working chamber after contraction as said rotor planetates, and multispark ignition means comprising a spark plug mounted on said housing having a non-grounded first electrode arranged to be exposed to each working chamber in a contracted condition occurring after connection to said intake passage means and before connection to said exhaust passage means, a non-grounded second electrode insulatedly mounted on each said rotor face intermediate said leading and trailing ends and arranged to pass opposite said spark plug electrode with a spark gap therebetween at a leading place at least proximately midway between said rotor face leading and trailing ends as said rotor planetates, a non-grounded third electrode insulatedly mounted on each said rotor face and spaced a spark gap from said non-grounded second electrode at an intermediate place intermediate the first-stated spark gap and said rotor face trailing end, a grounded fourth electrode mounted on each said rotor face and spaced a spark gap from said non-grounded third electrode at a trailing place intermediate the second-stated spark gap and said rotor face trailing end whereby on application of voltage across said spark plug electrode and said grounded electrode there is effected a spark across each of said spark gaps in each of said working chambers while in a contracted condition.

25. The rotary combustion engine set forth in claim 24 and the leading spark gap having a capacitance thereacross substantially smaller than that across the other spark gaps.

26. The rotary combustion engine set forth in claim 24 and one of said spark gaps in each said working chamber having a sufficient size so that a spark thereacross at engine loads below a predetermined load and above a predetermined air-fuel ratio is insufficient for fuel ignition.

27. A rotary combustion engine comprising a housing having a cavity, a rotor disposed in said cavity having a plurality of faces, an output shaft rotatably supported by said housing and having an eccentric rotatably supporting said rotor, said rotor faces and said housing cooperatively providing a plurality of variable volume working chambers spaced around said rotor and moving with said rotor and varying between a minimum volume and a maximum volume as said rotor and said output shaft turn and wherein each said rotor face has a leading end and a trailing end, intake passage means connected to each said working chamber prior to contraction as said rotor planetates, exhaust passage means connected to each said working chamber after contraction as said rotor planetates, and multispark ignition means comprising a spark plug mounted on said housing having a non-grounded first electrode arranged to be exposed to each working chamber in a contracted condition occurring after connection to said intake passage means and before connection to said exhaust passage means, a non-grounded second electrode insulatedly mounted on each said rotor face intermediate said leading and trailing ends and arranged to pass opposite said spark plug electrode with a spark gap therebetween at a leading place at least proximately midway between said rotor face leading and trailing ends as said rotor planetates, a grounded third electrode on said housing arranged to be a spark gap from said non-grounded second electrode at a trailing place intermediate the first-stated spark gap as said rotor planetates and said rotor face trailing end whereby on application of voltage across said spark plug and said grounded electrode there is effected a spark across each of said spark gaps in each of said working chambers while in a contracted condition.

28. The rotary combustion engine set forth in claim 27 and the leading spark gap having a capacitance thereacross substantially smaller than that across any other spark gap.

29. The rotary combustion engine set forth in claim 27 and one of said spark gaps in each said working chamber having a sufficient size so that a spark thereacross at engine loads below a predetermined load and above a predetermined air-fuel ratio is insufficient for fuel ignition.

* * * * *